US011894773B2

(12) United States Patent
Wang

(10) Patent No.: US 11,894,773 B2
(45) Date of Patent: Feb. 6, 2024

(54) BUCK-BOOST CIRCUIT AND CONTROL METHOD THEREFOR

(71) Applicant: SPREADTRUM COMMUNICATIONS (SHANGHAI) CO., LTD., Shanghai (CN)

(72) Inventor: Yongjin Wang, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 336 days.

(21) Appl. No.: 17/426,614

(22) PCT Filed: Mar. 5, 2019

(86) PCT No.: PCT/CN2019/077014
§ 371 (c)(1),
(2) Date: Jul. 28, 2021

(87) PCT Pub. No.: WO2020/155289
PCT Pub. Date: Aug. 6, 2020

(65) Prior Publication Data
US 2022/0094268 A1    Mar. 24, 2022

(30) Foreign Application Priority Data

Jan. 28, 2019 (CN) .......................... 201910081697.2

(51) Int. Cl.
*H02M 3/158* (2006.01)
*H02M 3/07* (2006.01)
(52) U.S. Cl.
CPC ........... *H02M 3/1582* (2013.01); *H02M 3/07* (2013.01); *H02M 3/158* (2013.01)
(58) Field of Classification Search
CPC ....... H02M 3/07; H02M 3/1582; H02M 3/158
See application file for complete search history.

(56) References Cited

U.S. PATENT DOCUMENTS 6,242,970 B1    6/2001  Grant et al.
10,615,696 B2 *  4/2020  Jung ................... H02M 3/1582
(Continued)

FOREIGN PATENT DOCUMENTS

CN    1682445 A       10/2005
CN    101057386 A     10/2007
(Continued)

OTHER PUBLICATIONS

First Chinese Office Action, dated Oct. 19, 2020, issued in corresponding Chinese Application No. 201910081697.2, filed Jan. 28, 2019, 10 pages.
(Continued)

*Primary Examiner* — Alex Torres-Rivera
(74) *Attorney, Agent, or Firm* — CHRISTENSEN O'CONNOR JOHNSON KINDNESS PLLC

(57) ABSTRACT

A buck-boost circuit is provided. First terminals of a first switch and a second switch are connected to an anode of the input power supply, first terminals of a third switch and a first capacitor are connected to a second terminal of the first switch, a second terminal of the third switch is connected to a cathode of the input power supply, a first terminal of a fourth switch, a second terminal of the first capacitor, and a first terminal of a first inductor are connected to a second terminal of the second switch, a second terminal of the fourth switch is connected to the cathode of the input power supply, a second terminal of the first inductor is connected to a anode of an output power supply, and a second capacitor is connected in parallel between the anode and a cathode of the output power supply.

10 Claims, 9 Drawing Sheets

(56) References Cited

U.S. PATENT DOCUMENTS

| | | | |
|---|---|---|---|
| 2005/0258889 A1 | 11/2005 | Tolle et al. | |
| 2008/0055946 A1 | 3/2008 | Lesso et al. | |
| 2008/0284498 A1 | 11/2008 | Xu et al. | |
| 2009/0167262 A1 | 7/2009 | Schoofs | |
| 2010/0156368 A1* | 6/2010 | Huynh | H02M 3/07 307/43 |
| 2011/0241766 A1 | 10/2011 | Zhang et al. | |
| 2013/0038305 A1 | 2/2013 | Arno et al. | |
| 2015/0022167 A1 | 1/2015 | LoCascio | |
| 2020/0161976 A1* | 5/2020 | Song | H02M 3/158 |

FOREIGN PATENT DOCUMENTS

| | | |
|---|---|---|
| CN | 101136590 A | 3/2008 |
| CN | 201682416 U | 12/2010 |
| CN | 101057386 B | 2/2011 |
| CN | 102594133 B | 10/2014 |
| CN | 104143909 A | 11/2014 |

OTHER PUBLICATIONS

International Search Report and Written Opinion, dated Oct. 11, 2019, issued in corresponding International Application No. PCT/CN2019/077014, filed Mar. 5, 2019, 12 pages.

Examination Report, Indian Patent Application No. 202127039043, dated May 4, 2022, 7 pages.

Extended European Search Report dated Sep. 15, 2022, issued in corresponding international Application No. 19913662, filed Mar. 5, 2019, 7 pages.

* cited by examiner

BUCK-BOOST CIRCUIT AND CONTROL METHOD THEREFOR

CROSS-REFERENCE TO RELATED APPLICATIONS

This application is a national stage of International Application No. PCT/CN2019/077014, filed on Mar. 5, 2019, which claims priority to Chinese Patent Application No. 201910081697.2, filed on Jan. 28, 2019. All of the aforementioned applications are hereby incorporated by reference in their entireties.

TECHNICAL FIELD

The present disclosure relates to the field of direct current conversion, and in particular, to a buck-boost circuit.

BACKGROUND

A buck-boost circuit can effectively reduce system power consumption by regulating an output voltage. With the starting of the age of 5G communication, a circuit capable of boosting and bucking a voltage quickly is needed to ensure a smooth communication and facilitate reduction of the system power consumption.

The existing buck-boost structure takes a too long time to realize buck-boost switching. As a result, a voltage stabilization time is relatively long when regulating the output voltage, especially when switching from a bucking mode to a boosting mode, an intermediate switching process is time-consuming, and thus the voltage stabilization time is too long to meet a communication requirement of a system, which reduces signal sensitivity when using the system, thereby causing a communication failure.

Therefore, how to reduce the voltage stabilization time of the buck-boost circuit during voltage regulation and regulate the voltage quickly has become a big problem to be solved.

SUMMARY

According to an aspect of the present disclosure, a buck-boost circuit is provided. The buck-boost circuit includes a first switch, a second switch, a third switch, a fourth switch, a first inductor, a first capacitor, and a second capacitor. A first terminal of the first switch is connected to an anode of an input power supply. A first terminal of the second switch is connected to the anode of the input power supply. A first terminal of the third switch and a first terminal of the first capacitor are connected to a second terminal of the first switch. A second terminal of the third switch is connected to a cathode of the input power supply. A first terminal of the fourth switch, a second terminal of the first capacitor, and a first terminal of the first inductor are connected to a second terminal of the second switch. A second terminal of the fourth switch is connected to the cathode of the input power supply. A second terminal of the first inductor is connected to an anode of an output power supply. The second capacitor is connected in parallel between the anode and a cathode of the output power supply In an embodiment, the buck-boost circuit further includes a fifth switch connected between the second terminal of the first capacitor and the second terminal of the second switch.

In an embodiment, the buck-boost circuit further includes a sixth switch connected in parallel with the first capacitor.

In an embodiment, the buck-boost circuit further includes a seventh switch connected in parallel with the first inductor.

In an embodiment, the buck-boost circuit further includes a control module configured to control switches based on a relationship between a target voltage $V_{tar}$ and an input voltage $V_{BAT}$, and the controlling the switches includes:

in response to $V_{tar} < V_{BAT} - \Delta V$ being satisfied, turning off the first switch and the third switch, and complementarily turning on the second switch and the fourth switch, where $\Delta V$ denotes a set voltage difference;

in response to $V_{BAT} - \Delta V \leq V_{tar} \leq V_{BAT} + \Delta V$ being satisfied, turning off the first switch, the third switch, and the fourth switch, and turning on the second switch; and in response to $V_{tar} > V_{BAT} + \Delta V$ being satisfied, turning off the fourth switch, enabling both the second switch and the third switch to operate simultaneously, and complementarily turning on the second switch and the first switch.

In an embodiment, the buck-boost circuit further includes a control module configured to control switches based on a relationship between a target voltage $V_{tar}$ and an input voltage $V_{BAT}$, and the controlling the switches includes:

in response to $V_{tar} < V_{BAT} - \Delta V$ being satisfied, turning off the fifth switch, enabling the first switch and the third switch to be in opposite states or to be both in an off state, and complementarily turning on the second switch and the fourth switch, where $\Delta V$ denotes a set voltage difference;

in response to $V_{BAT} - \Delta V \leq V_{tar} \leq V_{BAT} + \Delta V$ being satisfied, complementarily turning on the first switch and the third switch, complementarily turning on the fourth switch and the fifth switch, and turning on the second switch from turning-off of the first switch to turning-on of the fourth switch; and in response to $V_{tar} > V_{BAT} + \Delta V$ being satisfied, turning on the fifth switch, turning off the fourth switch, enabling both the second switch and the third switch to operate simultaneously, and complementarily turning on the second switch and the first switch.

In an embodiment, the buck-boost circuit further includes a control module configured to control switches based on a relationship between a target voltage $V_{tar}$ and an input voltage $V_{BAT}$, and the controlling the switches includes:

in response to $V_{tar} < V_{BAT} - \Delta V$ being satisfied, turning off the fifth switch, enabling the first switch and the third switch to be in opposite states or to be both in an off state, and complementarily turning on the second switch and the fourth switch, where $\Delta V$ denotes a set voltage difference;

in response to $V_{BAT} - \Delta V \leq V_{tar} \leq V_{BAT} + \Delta V$ being satisfied, complementarily turning on the first switch and the third switch, complementarily turning on the fourth switch and the fifth switch, and truing on the second switch from turning-off of the fourth switch to truing-on of the first switch; and in response to $V_{tar} > V_{BAT} + \Delta V$ being satisfied, turning on the fifth switch, turning off the fourth switch, enabling the second switch and the third switch to operate simultaneously, and complementarily turning on the second switch and the first switch.

In an embodiment, the buck-boost circuit further includes a control module configured to control switches based on a relationship between a target voltage $V_{tar}$ and an input voltage $V_{BAT}$, and the controlling the switches includes:

in response to $V_{tar} < V_{BAT} - \Delta V$ being satisfied, turning on the sixth switch, enabling the first switch and the second switch to simultaneously operate, enabling the third switch and the fourth switch to simultaneously operate, and complementarily turning on the first switch and the third switch, where $\Delta V$ denotes a set voltage difference;

in response to $V_{BAT}-\Delta V \leq V_{tar} \leq V_{BAT}+\Delta V$ being satisfied, turning off the first switch, the third switch, and the fourth switch, and turning on the second switch and the sixth switch; and in response to $V_{tar}>V_{BAT}+\Delta V$ being satisfied, turning off the fourth switch and the sixth switch, enabling the second switch and the third switch to operate simultaneously, and complementarily turning on the second switch and the first switch.

In an embodiment, the buck-boost circuit further includes a control module configured to control switches based on a relationship between an output voltage $V_{out}$ and a target voltage $V_{tar}$ and a relationship between the target voltage $V_{tar}$ and an input voltage $V_{BAT}$, and the controlling the switches includes:

in response to $V_{out}<V_{tar}-\Delta V$ and $V_{tar} \leq V_{BAT}$ being satisfied, turning off the fourth switch, and turning on the second switch and the seventh switch to charge the second capacitor connected to an output terminal of the buck-boost circuit; and turning off the seventh switch to enter a first operation mode in response to $V_{out}=V_{tar}-\Delta V$ being satisfied, where $\Delta V$ denotes a set voltage difference;

turning on the second switch, the third switch, and the seventh switch to charge the second capacitor in response to both $V_{out}<V_{tar}-\Delta V$ and $V_{tar}>V_{BAT}$ being satisfied; in response to $V_{out}=V_{BAT}$ being satisfied, turning off the second switch and the third switch, and simultaneously turning on the first switch to charge the second capacitor through the first capacitor; and turning off the first switch and the seventh switch to enter the first operation mode in response to $V_{out}=V_{tar}-\Delta V$ being satisfied;

turning on the seventh switch and the fourth switch to perform discharging in response to $V_{out}>V_{tar}+\Delta V$ being satisfied, and turning off the seventh switch and the fourth switch to enter the first operation mode in response to $V_{out}=V_{tar}+\Delta V$ being satisfied; and entering the first operation mode in response to $V_{tar}-\Delta V \leq V_{out} \leq V_{tar}+\Delta V$ being satisfied; and the first operation mode includes:

in response to $V_{tar}<V_{BAT}-\Delta V$ being satisfied, turning off the first switch and the third switch, and complementarily turning on the second switch and the fourth switch, where $\Delta V$ denotes the set voltage difference;

in response to $V_{BAT}-\Delta V \leq V_{tar} \leq V_{BAT}+\Delta V$ being satisfied, turning off the first switch, the third switch, and the fourth switch, and turning on the second switch; and in response to $V_{tar}>V_{BAT}+\Delta V$ being satisfied, turning off the fourth switch, enabling the second switch and the third switch to operate simultaneously, and complementarily turning on the second switch and the first switch.

In an embodiment, the control module is further configured to turn on the fifth switch in response to both $V_{out}<V_{tar}-\Delta V$ and $V_{tar}>V_{BAT}$ being satisfied and to turn off the fifth switch in response to $V_{out}=V_{BAT}$ being satisfied.

In an embodiment, the control module is further configured to turn on the sixth switch and the third switch to perform in response to $V_{out}>V_{tar}+\Delta V$ being satisfied and to turn off the sixth switch and the third switch in response to $V_{out}=V_{tar}+\Delta V$ being satisfied.

According to the following detailed description of exemplary embodiments with reference to the accompanying drawings, other features and aspects of the present disclosure will become clear.

BRIEF DESCRIPTION OF DRAWINGS

The accompanying drawings included in this specification and constituting a part of this specification, together with this specification, illustrate exemplary embodiments, features, and aspects of the present disclosure, and are used to explain the principle of the present disclosure.

DESCRIPTION OF EMBODIMENTS

Figure 1:
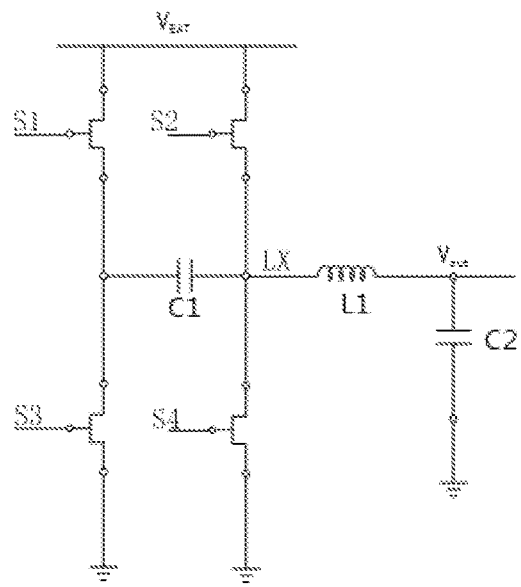
FIG. 1 is a structural diagram of a buck-boost circuit according to an embodiment of the present disclosure.

Various exemplary embodiments, features, and aspects of the present disclosure will be described in detail below with reference to the accompanying drawings. The same reference numerals in the accompanying drawings indicate elements with the same or similar functions. Although various aspects of the embodiments are shown in the accompanying drawings, unless otherwise noted, the accompanying drawings are not necessarily drawn to scale.

The dedicated word "exemplary" herein means "serving as an example, embodiment, or illustration". Any embodiment described herein as "exemplary" need not be construed as being superior to or better than other embodiments.

In addition, to better illustrate the present disclosure, numerous specific details are given in the following specific implementations. Those skilled in the art should understand that the present disclosure can also be implemented without certain specific details. In some examples, the methods, means, elements, and circuits well-known to those skilled in the art are not described in detail in order to highlight the subject matter of the present disclosure.

FIG. 1 is a structural diagram of a buck-boost circuit according to an embodiment of the present disclosure. As shown in FIG. 1, the buck-boost circuit includes a first switch S1, a second switch S2, a third switch S3, a fourth switch S4, a first inductor L1, a first capacitor C1, and a second capacitor C2.

A first terminal of the first switch S1 is connected to an anode of an input power supply $V_{BAT}$, a first terminal of the second switch S2 is connected to the anode of the input power supply $V_{BAT}$, a first terminal of the third switch S3 and a first terminal of the first capacitor C1 are connected to a second terminal of the first switch S1, a second terminal of the third switch S3 is connected to a cathode of the input power supply $V_{BAT}$ (for example, for grounding), a first terminal of the fourth switch S4, a second terminal of the first capacitor C1, and a first terminal of the first inductor L1 are connected to a second terminal of the second switch S2, a second terminal of the fourth switch S4 is connected to the cathode of the input power supply $V_{BAT}$ (for example, for grounding), a second terminal of the first inductor L1 is connected to an anode of an output power supply $V_{out}$, and the second capacitor C2 is connected in parallel between the anode and a cathode of the output power supply $V_{out}$.

A control module can be provided to control a status of each switch based on a relationship between a target voltage $V_{tar}$ and an input voltage $V_{BAT}$, to realize bucking and boosting modes of the circuit. The control module can be implemented in the buck-boost circuit, or can be independent from the buck-boost circuit, and can execute, according to a preset program or an external instruction, control methods provided in some embodiments of the present disclosure to control the switch. The switch not mentioned in the control methods is in an off state by default.

A control method of the buck-boost circuit in FIG. 1 includes:
when $V_{tar}<V_{BAT}-\Delta V$, turning off the first switch S1 and the third switch S3, and complementarily turning on the second switch S2 and the fourth switch S4, where $\Delta V$ represents a set voltage difference;
when $V_{BAT}-\Delta V \leq V_{tar} \leq V_{BAT}+\Delta V$, turning off the first switch S1, the third switch S3, and the fourth switch S4, and turning on the second switch S2; or
when $V_{tar}>V_{BAT}+\Delta V$, turning off the fourth switch S4, enabling the second switch S2 and the third switch S3 to operate simultaneously, and complementarily turning on the second switch S2 and the first switch S1.

Figure 2:
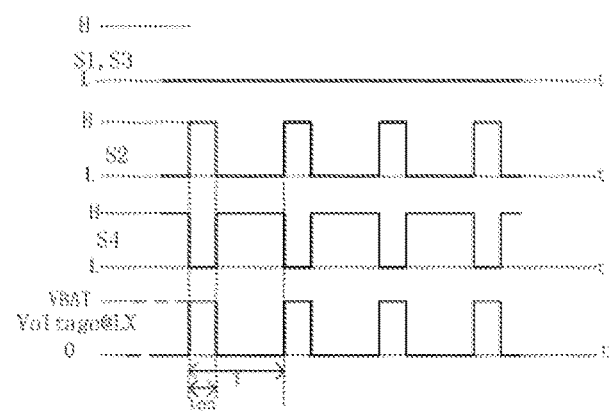
FIG. 2 shows a switch status of the buck-boost circuit in FIG. 1 in a bucking mode, and a voltage at a point LX.

In other words, when $V_{tar}<V_{BAT}-\Delta V$, the circuit operates in the bucking mode. $\Delta V$ represents the set voltage difference. It is defined as required, and for example, can be 100 mV, 200 mV, or the like. Referring to a switch status diagram shown in FIG. 2, the first switch S1 and the third switch S3 are turned off, so that both S1 and S3 are in an off state, and the second switch S2 and the fourth switch S4 are complementarily tuned on. When the second switch S2 is turned on, a voltage at LX is $V_{BAT}$, and an inductive current of the first inductor L1 increases linearly. When the second switch S2 is turned off and the fourth switch S4 is turned on, the voltage at the LX is 0. Because the inductive current cannot change suddenly, a circuit is formed through the fourth switch S4 to charge the second capacitor C2. Each switch has an initial state of an off state by default.

According to the volt-second principle, it can be learned that a calculation formula of an output voltage is: $V_{out}=(t_{on}/T) \times V_{BAT}$ (1), where $t_{on}$ represents a turn-on time of the second switch, and $t_{on}/T$ represents a duty cycle of a control voltage of the second switch.

Figure 3:
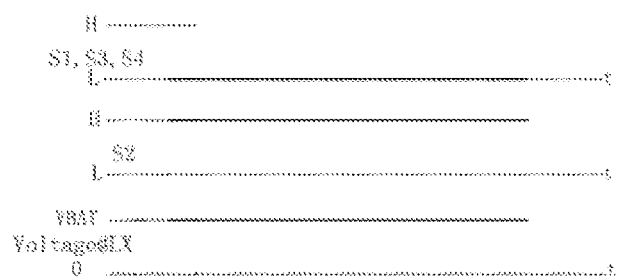
FIG. 3 shows a switch status of the buck-boost circuit in FIG. 1 in a bypass mode, and a voltage at a point LX.

When $V_{BAT}-\Delta V \leq V_{tar} \leq V_{BAT}+\Delta V$, the circuit operates in a bypass mode. Referring to a switch status diagram shown in FIG. 3, the first switch S1 and the third switch S3 are in the off state, the second switch S2 is in a normally-open state (namely, the second switch S2 is in an ON state continuously), and the fourth switch S4 is in a normally-closed state. The second switch S4 is always turned on, and the voltage at LX is always $V_{BAT}$. Therefore, $V_{out}=V_{BAT}$.

Figure 4:
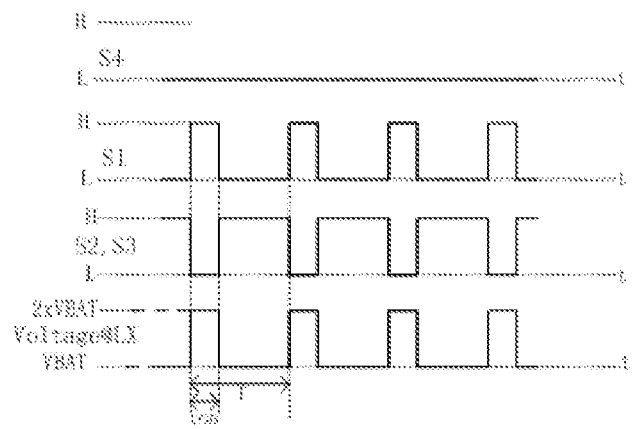
FIG. 4 shows a switch status of the buck-boost circuit in FIG. 1 in a boosting mode, and a voltage at a point LX.

When $V_{tar}>V_{BAT}+\Delta V$, the circuit operates in a boosting mode. Referring to a switch status diagram shown in FIG. 4, the fourth switch S4 is in the off state, the second switch S2 and the third switch S3 operate simultaneously, and the second switch S2 and the first switch S1 are complementarily turned on, in other words, the third switch S3 and the first switch S1 are also complementarily turned on. When the second switch S2 and the third switch S3 are turned on, the voltage at LX is $V_{BAT}$, and the inductive current of the first inductor L1 increases linearly. When the second switch S2 and the third switch S3 are turned off, and the first switch S1 is turned on, the first inductor L1 charges the first capacitor C1 to enable the voltage at LX to reach $2V_{BAT}$.

According to the volt-second principle, it can be learned that the calculation formula of the output voltage is: $V_{OUT}=(1+t_{on}/T) \times V_{BAT}$ (2).

Twice the input supply voltage is generated on one terminal of the inductor when the capacitor and the switch cooperate to operate, so that the buck-boost circuit in this embodiment can quickly boost the output voltage in the boosting mode. In this way, a voltage stabilization time can be reduced when the buck-boost circuit regulates the output voltage, and the voltage can be regulated quickly and stably.

It should be noted that each switch provided in the embodiments of the present disclosure can be a semiconductor transistor, such as a bipolar transistor, a field effect transistor, or a switch of any other type.

Figure 5:
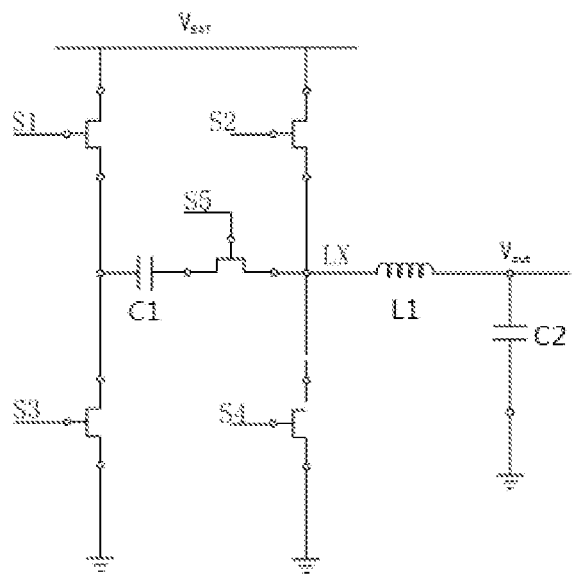
FIG. 5 is a structural diagram of a buck-boost circuit according to an embodiment of the present disclosure.

FIG. 5 is a structural diagram of a buck-boost circuit according to an embodiment of the present disclosure. As shown in FIG. 5, compared with the buck-boost circuit in FIG. 1, the buck-boost circuit further includes a fifth switch S5. The fifth switch S5 is connected in series with the first capacitor C1, and is connected between the second terminal of the first capacitor C1 and the second terminal of the second switch, in other words, between being connected between the second terminal of the first capacitor C1 and the first terminal of the first inductor L1.

When the fifth switch S5 is in the normally-open state, an operation status of the buck-boost circuit is the same as that in FIG. 1. S5 can be appropriately regulated based on an application scenario, so that the circuit can be applied more flexibly.

A first control method of the buck-boost circuit in FIG. 5 includes: when $V_{tar}<V_{BAT}-\Delta V$, turning off the fifth switch S5, enabling the first switch S1 and the third switch S3 to be in opposite states or to be both in the off state, and complementarily turning on the second switch S2 and the fourth switch S4, where $\Delta V$ represents the set voltage difference;
when $V_{BAT}-\Delta V \leq V_{tar} \leq V_{BAT}+\Delta V$, complementarily turning on the first switch S1 and the third switch S3, complementarily turning on the fourth switch S4 and the fifth switch S5, and enabling the second switch S2 to be switched on from turning-off of the first switch S1 to turning-on of the fourth switch S4; and when $V_{tar} > V_{BAT} + \Delta V$, turning on the fifth switch S5, turning off the fourth switch S4, enabling the second switch S2 and the third switch S3 to operate simultaneously, and complementarily turning on the second switch S2 and the first switch S1.

Figure 6:
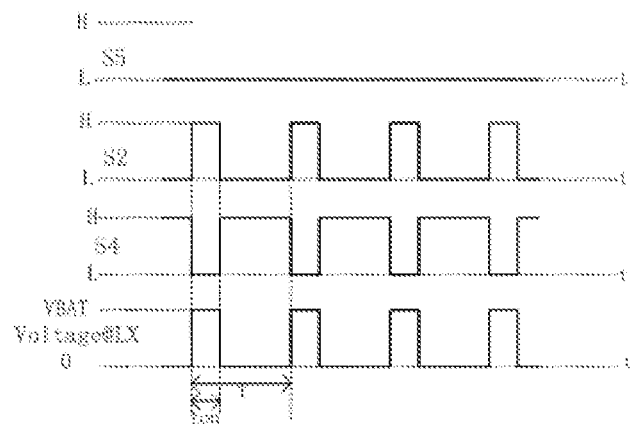
FIG. 6 shows a switch status of the buck-boost circuit in FIG. 5 in a bucking mode, and a voltage at a point LX.

In other words, when $V_{tar} < V_{BAT} - \Delta V$, the circuit operates in a bucking mode. Referring to a switch status diagram shown in FIG. 6, the fifth switch S5 is in the off state, the second switch S2 and the fourth switch S4 are complementarily turned on, and the first switch S1 and the third switch S3 have opposite statuses or are both in an off state, in other words, S1 is turned on and S3 is turned off, S3 is turned on and S1 is turned off, or both S1 and S3 are turned off. When the second switch S2 is turned on, the voltage at LX is $V_{BAT}$, and the inductive current of the first inductor L1 increases linearly. When the second switch S2 is turned off and the fourth switch S4 is turned on, the voltage at LX is 0. Because the inductive current cannot change suddenly, the circuit is formed through the fourth switch S4 to charge the second capacitor C2.

Figure 7:
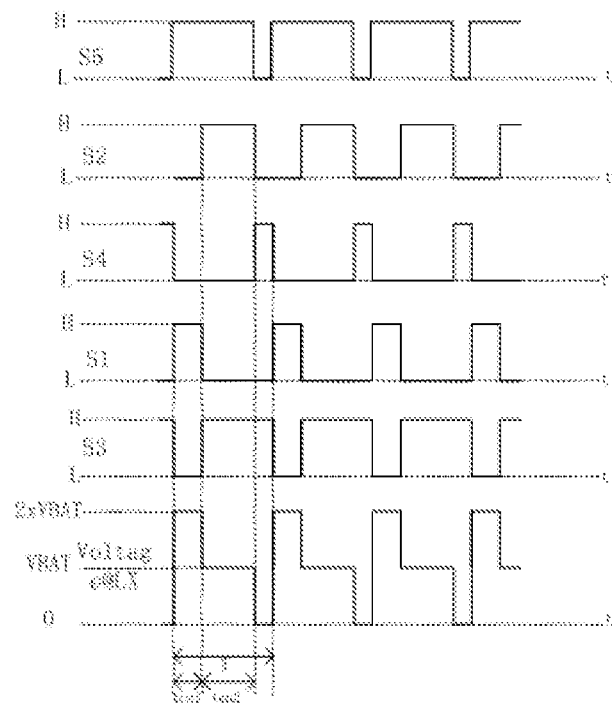
FIG. 7 shows a switch status of the buck-boost circuit in FIG. 5 in a bucking and boosting mode, and a voltage at a point LX.

When $V_{BAT} - \Delta V \leq V_{tar} \leq V_{BAT} + \Delta V$, the circuit operates in a bucking and boosting mode, and a control method can be referred to FIG. 7. The first switch S1 and the third switch S3 are complementarily turned on, the fourth switch S4 and the fifth switch S5 are complementarily turned on, and the second switch S2 is turned on from turning off of the first switch S1 to turning on of the fourth switch S4. When both the first switch S1 and the fifth switch S5 are turned on, the voltage at LX is $2V_{BAT}$, and a turn-on time of the first switch S1 is $t_{on1}$, in other words, a time during which both the first switch S1 and the fifth switch S5 are turned on is $t_{on1}$. When the first switch S1 is turned off and the second switch S2 is turned on, the voltage at LX is $V_{BAT}$, and a turn-on time of the second switch S2 is $t_{on2}$. When the fourth switch S4 is turned on, the voltage at LX is 0. A desired output voltage is obtained by controlling $t_{on1}$ and $t_{on2}$. The calculation formula of the output voltage is:

$$V_{out} = (t_{on1}/T) \times 2V_{BAT} + (t_{on2}/T) \times V_{BAT} \quad (3).$$

Figure 8:
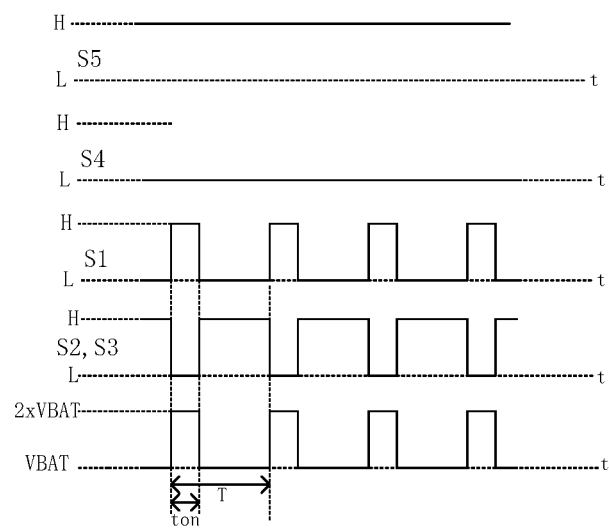
FIG. 8 shows a switch status of the buck-boost circuit in FIG. 5 in a boosting mode, and a voltage at a point LX.

When $V_{tar} > V_{BAT} + \Delta V$, the circuit operates in the boosting mode. Referring to a switch status diagram shown in FIG. 8, the fifth switch S5 is turned on, the fourth switch S4 is turned off, the second switch S2 and the third switch S3 operates simultaneously, and the second switch S2 and the first switch S1 are complementarily turned on. The operation mode is the same as the boosting mode in FIG. 1.

A second control method of the buck-boost circuit in FIG. 5 includes: when $V_{tar} < V_{BAT} - \Delta V$, turning off the fifth switch S5, enabling the first switch S1 and the third switch S3 to be in opposite states or to be both in the off state, and complementarily turning on the second switch S2 and the fourth switch S4, where $\Delta V$ represents the set voltage difference;

when $V_{BAT} - \Delta V \leq V_{tar} \leq V_{BAT} + \Delta V$, complementarily turning on the first switch S1 and the third switch S3, complementarily turning on the fourth switch S4 and the fifth switch S5, and turning on the second switch S2 from turning-off of the fourth switch S4 to turning-on of the first switch S1; and when $V_{tar} > V_{BAT} + \Delta V$, turning on the fifth switch S5, turning off the fourth switch S4, enabling both the second switch S2 and the third switch S3 to operate simultaneously, and complementarily turning on the second switch S2 and the first switch S1.

The control method is different from the first control method only when $V_{BAT} - \Delta V \leq V_{tar} \leq V_{BAT} + \Delta V$.

Figure 9:
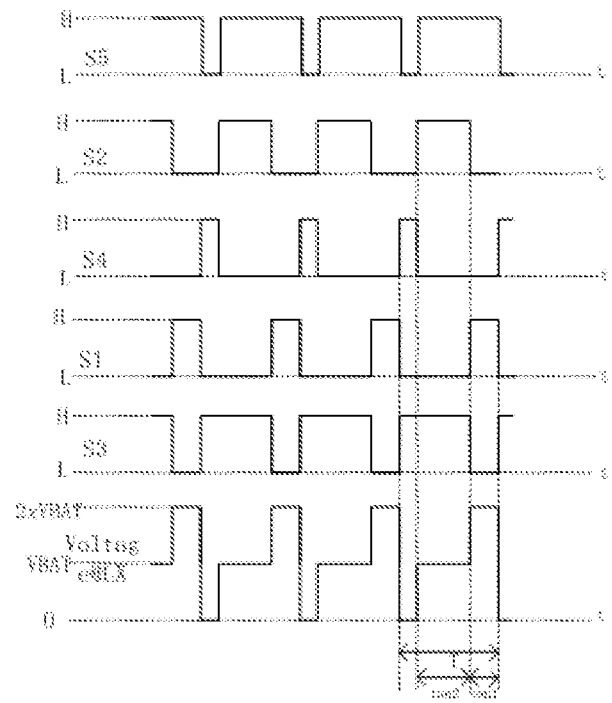
FIG. 9 shows another switch status of the buck-boost circuit in FIG. 5 in a bucking and boosting mode, and a voltage at a point LX.

When $V_{BAT} - \Delta V \leq V_{tar} \leq V_{BAT} + \Delta V$, the circuit operates in a bucking and boosting mode. A control method can be referred to FIG. 9. The first switch S1 and the third switch S3 are complementarily turned on, the fourth switch S4 and the fifth switch S5 are complementarily turned on, and the second switch S2 is turned on from turning-off of the fourth switch S4 to turning-on of the first switch S1. When the fourth switch S4 is turned on, the voltage at LX is 0. When the fourth switch S4 is turned off and the second switch S2 is turned on, the voltage at LX is $V_{BAT}$, and a turning-on time of the second switch S2 is $t_{on2}$. When the first switch S1 is turned on, the voltage at LX is $2V_{BAT}$, and a turning-on time of the first switch S1 is $t_{on1}$. Similarly, a desired output voltage is obtained by controlling $t_{on1}$ and $t_{on2}$. The calculation formula of the output voltage is the same as the formula (3).

Figure 10:
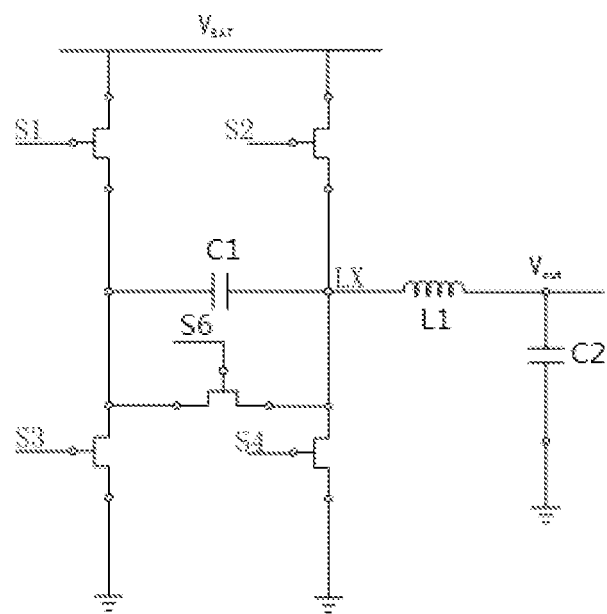
FIG. 10 is a structural diagram of a buck-boost circuit according to an embodiment of the present disclosure.

FIG. 10 is a structural diagram of a buck-boost circuit according to an embodiment of the present disclosure. As shown in FIG. 10, compared with the buck-boost circuit in FIG. 1, the buck-boost circuit further includes a sixth switch S6. The sixth switch S6 is connected in parallel to the first capacitor C1, and is connected between the second terminal of the first switch S1 and the first terminal of the first inductor.

When the sixth switch S6 is in the normally-closed state (in other words, is always turned off), an operation status of the buck-boost circuit is the same as that in FIG. 1.

A control method of the buck-boost circuit in FIG. 10 includes:

when $V_{tar} < V_{BAT} - \Delta V$, turning on the sixth switch S6, enabling both the first switch S1 and the second switch S2 to operate simultaneously, enabling both the third switch S3 and the fourth switch S4 to operate simultaneously, and complementarily turning on the first switch S1 and the third switch S3 to be in complementary control, where $\Delta V$ represents the set voltage difference;

when $V_{BAT} - \Delta V \leq V_{tar} \leq V_{BAT} + \Delta V$, turning off the first switch S1, the third switch S3, and the fourth switch S4, and turning on the second switch S2 and the sixth switch S6; and when $V_{tar} > V_{BAT} + \Delta V$, turning off the fourth switch S4 and the sixth switch S6, enabling both the second switch S2 and the third switch S3 to operate simultaneously, and complementarily turning on the second switch S2 and the first switch S1.

Figure 11:
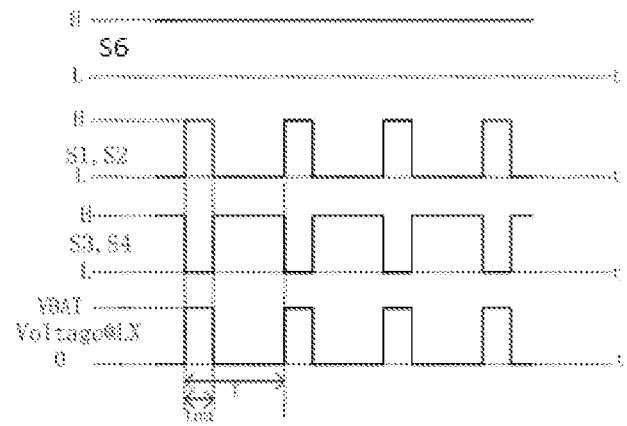
FIG. 11 shows a switch status of the buck-boost circuit in FIG. 10 in a bucking mode, and a voltage at a point LX.

In other words, when $V_{tar} < V_{BAT} - \Delta V$, the circuit operates in the bucking mode. Referring to a switch status diagram shown in FIG. 11, the sixth switch S6 is turned on, the first switch S1 and the second switch S2 operate simultaneously, the third switch S3 and the fourth switch S4 operate simultaneously, and the first switch S1 and the third switch S3 are complementarily turned on. When the first switch S1 and the second switch S2 are turned on, the voltage at LX is $V_{BAT}$. When the first switch S1 and the second switch S2 are turned off, and the third switch and the fourth switch S4 are turned on, the voltage at LX is 0.

Figure 12:
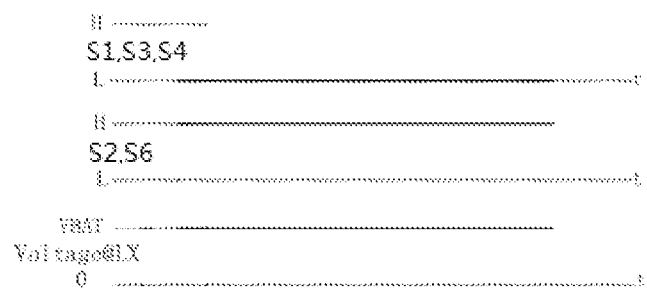
FIG. 12 shows a switch status of the buck-boost circuit in FIG. 10 in a bypass mode, and a voltage at a point LX.

When $V_{BAT} - \Delta V \leq V_{tar} \leq V_{BAT} + \Delta V$, the circuit operates in the bypass mode. Referring to a switch status diagram shown in FIG. 12, the first switch S1, the third switch S3, and the fourth switch S4 are turned off, and the second switch S2 and the sixth switch S6 are turned on.

Figure 13:
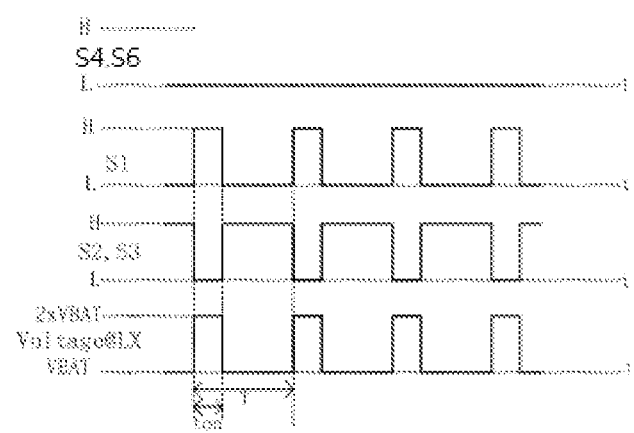
FIG. 13 shows a switch status of the buck-boost circuit in FIG. 10 in a boosting mode, and a voltage at a point LX.

When $V_{tar} > V_{BAT} + \Delta V$, the circuit operates in the boosting mode. Referring to a switch status diagram shown in FIG. 13, the fourth switch S4 and the sixth switch S6 are turned off, the second switch S2 and the third switch S3 operate simultaneously, and the second switch S2 and the first switch S1 are complementarily turned on. When the first switch S1 is turned on, the voltage at LX is $2V_{BAT}$. When the first switch S1 is turned off, and the second switch S2 and the third switch S3 are turned on, the voltage at LX is $V_{BAT}$. In other words, the sixth switch is in the normally-closed state, which is the same as that in the boosting mode in FIG. 1.

Figure 14:
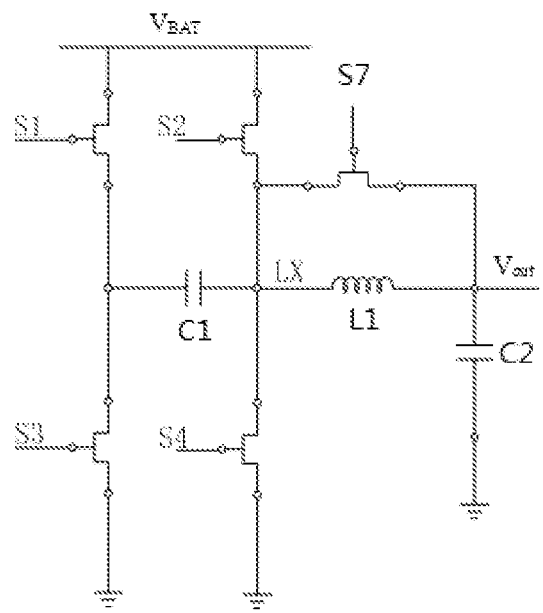
FIG. 14 is a structural diagram of a buck-boost circuit according to an embodiment of the present disclosure.

FIG. 14 is a structural diagram of a buck-boost circuit according to an embodiment of the present disclosure. As shown in FIG. 14, compared with the buck-boost circuit in FIG. 1, the buck-boost circuit further includes a seventh switch S7. The seventh switch S7 is connected in parallel with the first inductor L1, and is connected between the second terminal of the second switch S1 and the anode of the output power supply.

When the seventh switch S7 is in the normally-closed state, the circuit is the same as that in FIG. 1. When the output voltage of the circuit is required to be regulated, the seventh switch S7 is turned on to charge or discharge the output capacitor quickly, so that the output voltage can be quickly regulated to the target voltage.

The control module controls the switches based on the relationship between the output voltage $V_{out}$ and the target voltage $V_{tar}$ and the relationship between the target voltage $V_{tar}$ and the input voltage $V_{BAT}$, and such controlling includes:

when $V_{out}<V_{tar}-\Delta V$ and $V_{tar}\leq V_{BAT}$, turning off the fourth switch S4, and turning on the second switch S2 and the seventh switch S7 to charge the second capacitor C2 connected to an output terminal of the buck-boost circuit; and when $V_{out}=V_{tar}-\Delta V$, turning off the seventh switch S7 to enter the first operation mode, where $\Delta V$ represents the set voltage difference;

when $V_{out}<V_{tar}-\Delta V$ and $V_{tar}\leq V_{BAT}$, turning on the second switch S2, the third switch S3, and the seventh switch S7 to charge the second capacitor C2; when $V_{out}=V_{tar}-\Delta V$, turning off the second switch S2 and the third switch S3, and turning on the first switch S1 to charge the second capacitor C2 through the first capacitor C1; and when $V_{out}=V_{tar}-\Delta V$, turning off the first switch S1 and the seventh switch S7 to enter the first operation mode;

when $V_{out}>V_{tar}+\Delta V$, turning on the seventh switch S7 and the fourth switch S4 to perform discharging, and when $V_{out}=V_{tar}+\Delta V$, turning off the seventh switch S7 and the fourth switch S4 to enter the first operation mode; and when $V_{tar}-\Delta V\leq V_{out}\leq V_{tar}+\Delta V$, entering the first operation mode.

The first operation mode includes:

when $V_{tar}<V_{BAT}-\Delta V$, truing off the first switch S1 and the third switch S3, and complementarily turning on the second switch S2 and the fourth switch S4, where $\Delta V$ represents the set voltage difference;

when $V_{BAT}-\Delta V\leq V_{tar}\leq V_{BAT}+\Delta V$, turning off the first switch S1, the third switch S3, and the fourth switch S4, and turning on the second switch S2; and when $V_{tar}>V_{BAT}+\Delta V$, turning off the fourth switch S4, enabling the second switch S2 and the third switch S3 to operate simultaneously, and complementarily turning on the second switch S2 and the first switch.

Figure 15:
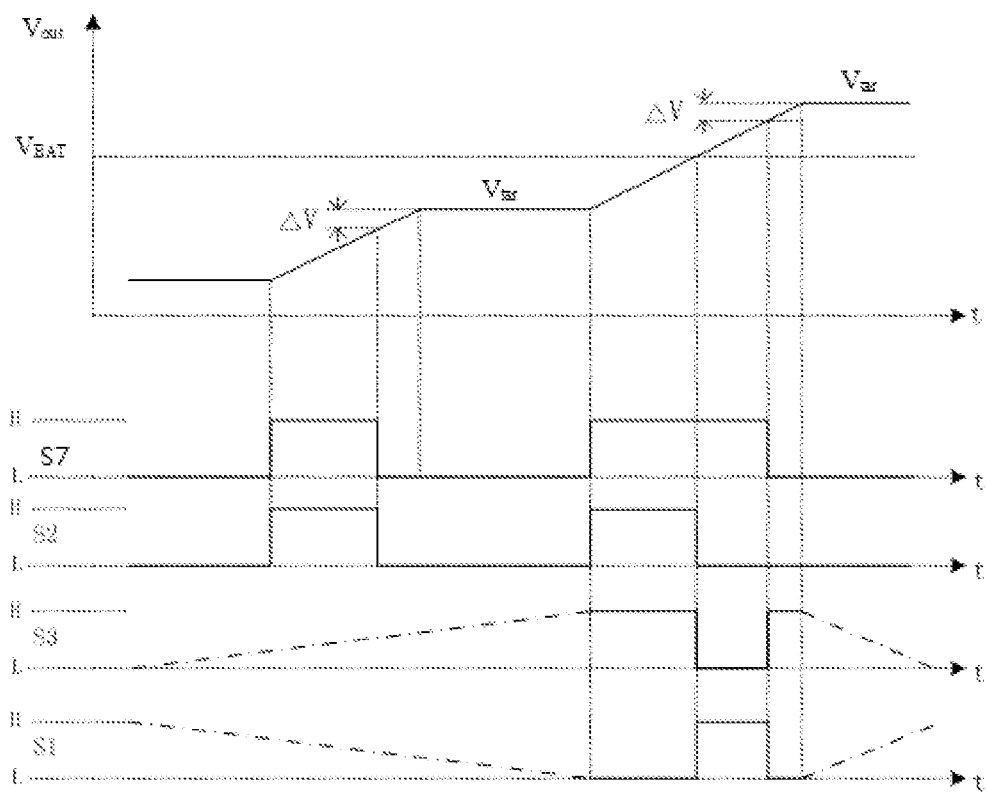
FIG. 15 shows an output voltage and a switch status in a boosting process of the buck-boost circuit in FIG. 14.

FIG. 15 shows an output voltage and a switch status in a boosting process of the buck-boost circuit in this embodiment. When $V_{out}<V_{tar}-\Delta V$ and $V_{tar}\leq V_{BAT}$, as represented by the first half of an output voltage curve in FIG. 15, the circuit is essentially a bucking circuit, and the actual output voltage is smaller than the target voltage, and needs to be boosted to reach the target voltage, in other words, the output voltage is in a boosting state.

At an initial stage, the supply voltage $V_{BAT}$ is higher than the output voltage. Firstly, the fourth switch S4 is turned off, and the second switch S2 and the seventh switch S7 are turned on to quickly charge the second capacitor C2 connected to the output terminal of the buck-boost circuit. The output voltage is boosted quickly. When the output voltage is smaller than the target voltage by $\Delta V$, namely, $V_{out}=V_{tar}-\Delta V$, the seventh switch S7 is turned off to stop quick charging. The circuit is restored to the structure in FIG. 1, and enters a control process of the buck-boost circuit in FIG. 1, in other words, entering the first operation mode. The output voltage is gradually regulated to the target voltage $V_{tar}$, and $V_{tar}$ is stably output.

When $V_{tar}>V_{BAT}$, as represented by the last half of the output voltage curve in FIG. 15, the circuit is essentially a boosting circuit, and the actual output voltage needs to be boosted to reach the target voltage, in other words, the output voltage is in the boosting state. Firstly, the second switch S2, the third switch S3, and the seventh switch S7 are turned on. When the output voltage reaches $V_{BAT}$, the second switch S2 and the third switch S3 are turned off, and the first switch S1 is turned on to continue to quickly charge the second capacitor C2 through the first capacitor C1. When the output voltage is smaller than the target voltage by $\Delta V$, the first switch S1 and the seventh switch S7 are turned off. The circuit is restored to the structure in FIG. 1, and enters the control process of the buck-boost circuit in FIG. 1, in other words, entering the first operation mode.

Figure 16:
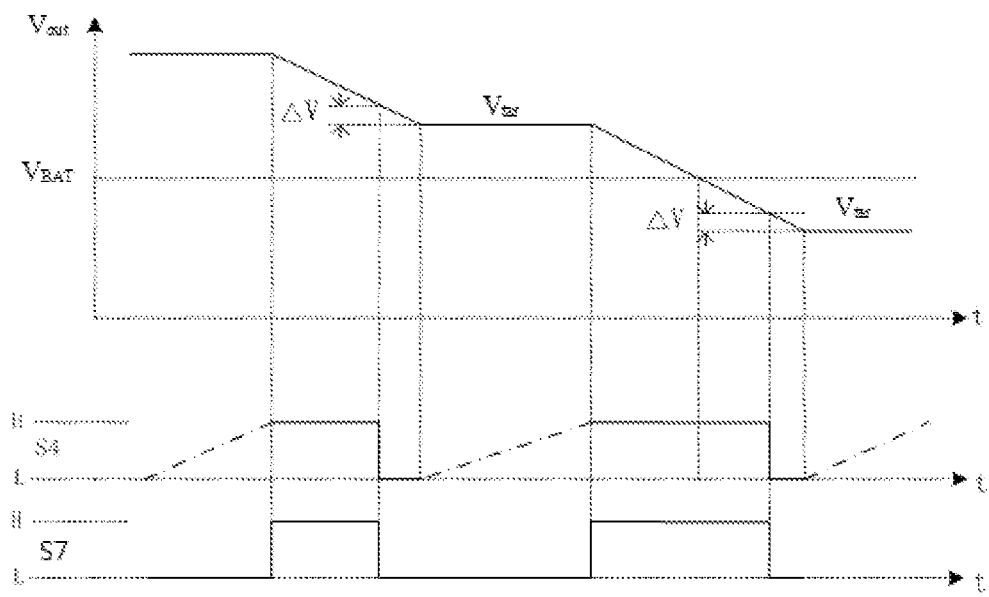
FIG. 16 shows an output voltage and a switch status in a bucking process of the buck-boost circuit in FIG. 14.

FIG. 16 shows an output voltage and a switch status in a bucking process of the buck-boost circuit in this embodiment. When $V_{out}>V_{tar}+\Delta V$, as represented by an output voltage curve in FIG. 16, the actual output voltage is greater than the target voltage, and needs to be bucked to reach the target voltage, in other words, the output voltage is in a bucking state.

Firstly, the seventh switch S7 and the fourth switch S4 are turned on to discharge the second capacitor C2 connected to the output terminal. When the voltage is greater than the target voltage by $\Delta V$, namely, $V_{out}=V_{tar}+\Delta V$, the seventh switch S7 and the fourth switch S4 are turned off. The circuit is restored to the structure in FIG. 1, and enters the control process of the buck-boost circuit in FIG. 1, in other words, entering the first operation mode.

Figure 17:
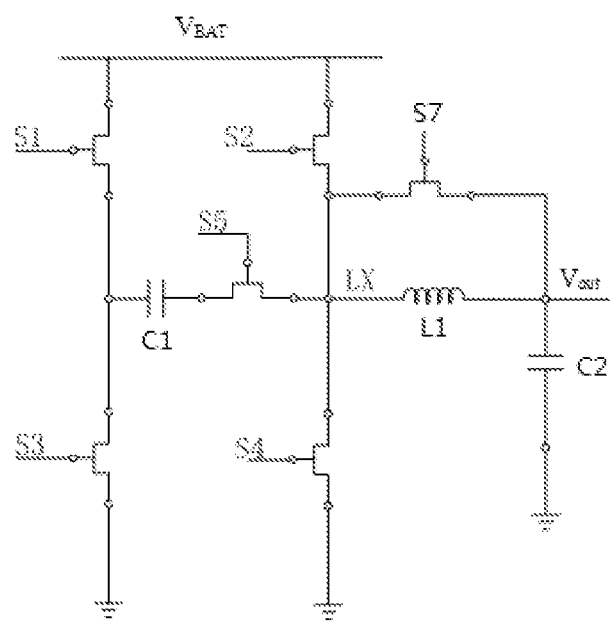
FIG. 17 is a structural diagram of a buck-boost circuit according to an embodiment of the present disclosure.

FIG. 17 is a structural diagram of a buck-boost circuit according to an embodiment of the present disclosure. As shown in FIG. 17, compared with the buck-boost circuit in FIG. 5, the buck-boost circuit further includes a seventh switch S7. The seventh switch S7 is connected in parallel with the first inductor L1, and is connected between the second terminal of the second switch S1 and the anode of the output power supply.

When the seventh switch S7 is in the normally-closed state, the circuit is the same as that in FIG. 5. When the fifth switch S7 is in the normally-open state, the operation status is similar to that of the buck-boost circuit in FIG. 14, and a difference is that the control module is further configured to turn on the fifth switch S5 when $V_{out}<V_{tar}-\Delta V$ and $V_{tar}>V_{BAT}$, and to turn off the fifth switch S5 when $V_{out}=V_{BAT}$.

Figure 18:
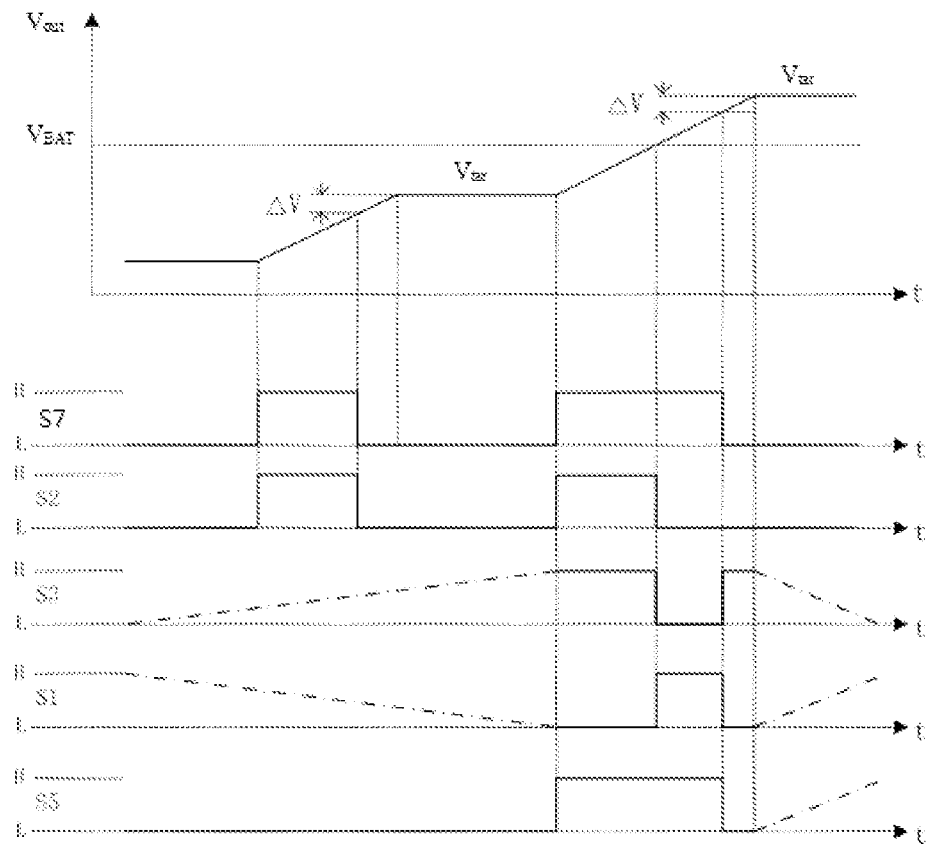
FIG. 18 shows an output voltage and a switch status in a boosting process of the buck-boost circuit in FIG. 17.

In other words, in a boosting process, when $V_{out}>V_{BAT}$, the fifth switch S5 needs to be turned on. A control method is shown in FIG. 18. Control methods of the first switch S1, the second switch S2, the third switch S3, and the seventh switch S7 are the same as those in the boosting process of the buck-boost circuit in FIG. 14.

Figure 19:
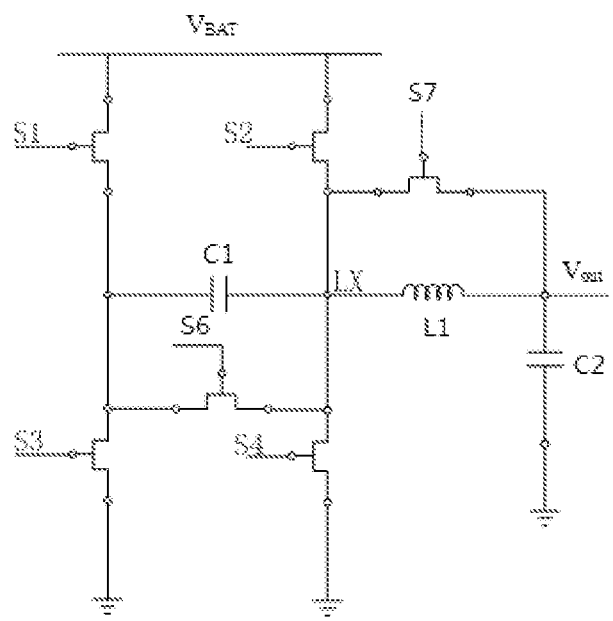
FIG. 19 is a structural diagram of a buck-boost circuit according to an embodiment of the present disclosure.

FIG. 19 is a structural diagram of a buck-boost circuit according to an embodiment of the present disclosure. As shown in FIG. 19, compared with the buck-boost circuit in FIG. 10, the buck-boost circuit further includes a seventh switch S7. The seventh switch S7 is connected in parallel with the first inductor L1, and is connected between the second terminal of the second switch S1 and the anode of the output power supply.

When the seventh switch S7 is in the normally-closed state, the circuit is the same as that in FIG. 10. When the sixth switch S6 is in the off state, the operation status is similar to that of the buck-boost circuit in FIG. 14, and a difference is that the control module is further configured to turn on the sixth switch S6 and the third switch S3 to perform discharging when $V_{out}>V_{tar}+\Delta V$, and to turn off the sixth switch S6 and the third switch S3 when $V_{out}=V_{tar}+\Delta V$.

Figure 20:
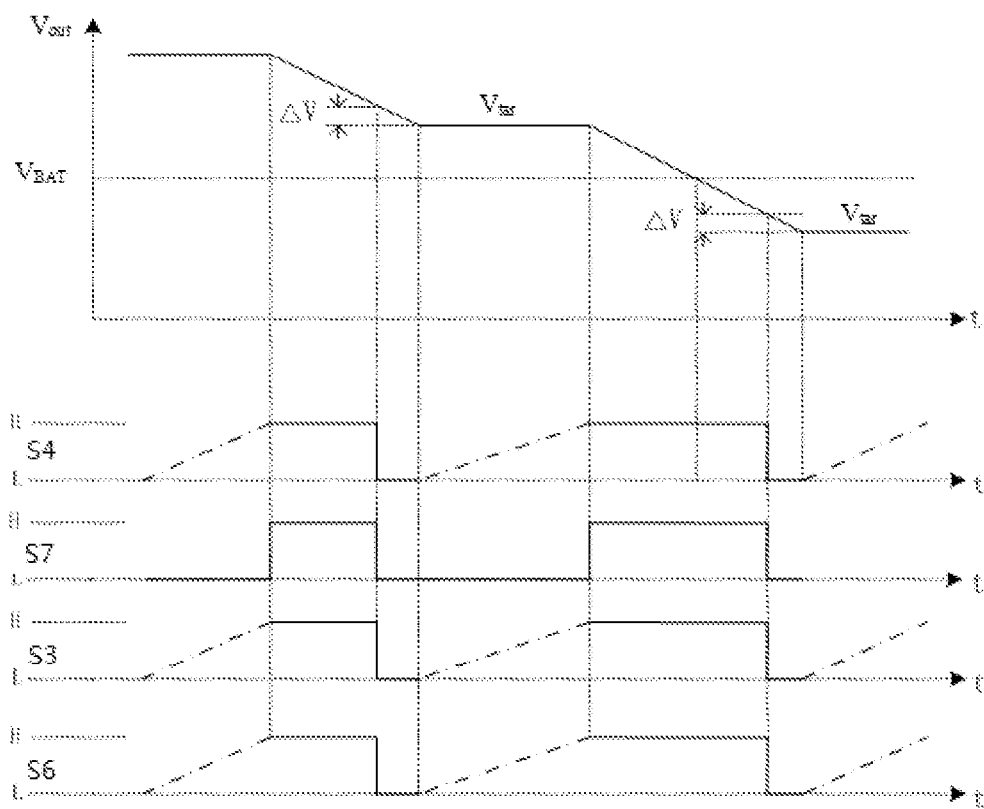
FIG. 20 shows an output voltage and a switch status in a bucking process of the buck-boost circuit in FIG. 19.

In other words, in the discharging process, the third switch S3 and the sixth switch S6 are turned on to speed up the discharging. A control method is shown in FIG. 20. Control methods of the fourth switch S4 and the seventh switch S7 are the same as those in the bucking process of the buck-boost circuit in FIG. 14.

The embodiments of the present disclosure have been described above, and the above description is exemplary, not exhaustive, and is not limited to the disclosed embodiments. It is apparent to those skilled in the art that many modifications and changes may be made without departing from the scope and spirit of the described embodiments. The terms used in this specification are selected to best explain principles of the embodiments, practical applications, or improvements to technologies in the market, or to enable other persons of ordinary skill in the art to understand the embodiments disclosed in this specification.

What is claimed is:

1. A buck-boost circuit, comprising a first switch, a second switch, a third switch, a fourth switch, a fifth switch, a first inductor, a first capacitor, and a second capacitor,
   wherein a first terminal of the first switch is connected to an anode of an input power supply; a first terminal of the second switch is connected to the anode of the input power supply; a first terminal of the third switch and a first terminal of the first capacitor are connected to a second terminal of the first switch; a second terminal of the third switch is connected to a cathode of the input power supply; a first terminal of the fourth switch, a second terminal of the first capacitor, and a first terminal of the first inductor are connected to a second terminal of the second switch; a second terminal of the fourth switch is connected to the cathode of the input power supply; a second terminal of the first inductor is connected to an anode of an output power supply; the second capacitor is connected in parallel between the anode and a cathode of the output power supply; and the fifth switch is connected between the second terminal of the first capacitor and the second terminal of the second switch.

2. The buck-boost circuit according to claim 1, further comprising:
   a seventh switch connected in parallel with the first inductor.

3. The buck-boost circuit according to claim 2, further comprising:
   a control module configured to control switches based on a relationship between an output voltage $V_{out}$ and a target voltage $V_{tar}$ and a relationship between the target voltage $V_{tar}$ and an input voltage $V_{BAT}$,
   wherein said controlling the switches comprises:
   in response to $V_{out}<V_{tar}-\Delta V$ and $V_{tar}<V_{BAT}$ being satisfied, turning off the fourth switch, and turning on the second switch and the seventh switch to charge the second capacitor connected to an output terminal of the buck-boost circuit; and turning off the seventh switch to enter a first operation mode in response to $V_{out}=V_{tar}-\Delta V$ being satisfied, wherein $\Delta V$ denotes a set voltage difference;
   turning on the second switch, the third switch, and the seventh switch to charge the second capacitor in response to both $V_{out}<V_{tart}-\Delta V$ and $V_{tar}>V_{BAT}$ being satisfied; in response to $V_{out}=V_{BAT}$ being satisfied, turning off the second switch and the third switch, and simultaneously turning on the first switch to charge the second capacitor through the first capacitor; and turning off the first switch and the seventh switch to enter the first operation mode in response to $V_{out}=V_{tart}-\Delta V$ being satisfied;
   turning on the seventh switch and the fourth switch to perform discharging in response to $V_{out}>V_{tar}+\Delta V$ being satisfied, and turning off the seventh switch and the fourth switch to enter the first operation mode in response to $V_{out}=V_{tar}+\Delta V$ being satisfied; and
   entering the first operation mode in response to $V_{tar}-\Delta V \leq V_{out} \leq V_{tar}+\Delta V$ being satisfied; and
   wherein the first operation mode comprises:
   in response to $V_{tar}<V_{BAT}-\Delta V$ being satisfied, turning off the first switch and the third switch, and complementarily turning on the second switch and the fourth switch, wherein $\Delta V$ denotes the set voltage difference;
   in response to $V_{BAT}-\Delta V \leq V_{tar} \leq V_{BAT}+\Delta V$ being satisfied, turning off the first switch, the third switch, and the fourth switch, and turning on the second switch; and
   in response to $V_{tar}>V_{BAT}+\Delta V$ being satisfied, turning off the fourth switch, enabling the second switch and the third switch to operate simultaneously, and complementarily turning on the second switch and the first switch.

4. The buck-boost circuit according to claim 3, wherein the control module is further configured to turn on the fifth switch in response to both $V_{out}<V_{tar}-\Delta V$ and $V_{tar}>V_{BAT}$ being satisfied and to turn off the fifth switch in response to $V_{out}=V_{BAT}$ being satisfied.

5. The buck-boost circuit according to claim 3, wherein the control module is further configured to turn on the sixth switch and the third switch to perform discharging in response to $V_{out}>V_{tar}+\Delta V$ being satisfied and to turn off the sixth switch and the third switch in response to $V_{out}=V_{tar}+\Delta V$ being satisfied.

6. The buck-boost circuit according to claim 1, further comprising:
   a control module configured to control switches based on a relationship between a target voltage $V_{tar}$ and an input voltage $V_{BAT}$,
   wherein said controlling the switches comprises:
   in response to $V_{tar}<V_{BAT}-\Delta V$ being satisfied, turning off the first switch and the third switch, and complementarily turning on the second switch and the fourth switch, wherein $\Delta V$ denotes a set voltage difference;
   in response to $V_{BAT}-\Delta V \leq V_{tar} \leq V_{BAT}+\Delta V$ being satisfied, turning off the first switch, the third switch, and the fourth switch, and turning on the second switch; and
   in response to $V_{tar}>V_{BAT}+\Delta V$ being satisfied, turning off the fourth switch, enabling both the second switch and the third switch to operate simultaneously, and complementarily turning on the second switch and the first switch.

7. The buck-boost circuit according to claim 1, further comprising:
  a control module configured to control switches based on a relationship between a target voltage $V_{tar}$ and an input voltage $V_{BAT}$,
  wherein said controlling the switches comprises:
  in response to $V_{tar}<V_{BAT}-\Delta V$ being satisfied, turning off the fifth switch, enabling the first switch and the third switch to be in opposite states or to be both in an off state, and complementarily turning on the second switch and the fourth switch, wherein $\Delta V$ denotes a set voltage difference;
  in response to $V_{BAT}-\Delta V \leq V_{tar}<V_{BAT}+\Delta V$ being satisfied, complementarily turning on the first switch and the third switch, complementarily turning on the fourth switch and the fifth switch, and turning on the second switch from turning-off of the first switch to turning-on of the fourth switch; and
  in response to $V_{tar}>V_{BAT}+\Delta V$ being satisfied, turning on the fifth switch, turning off the fourth switch, enabling both the second switch and the third switch to operate simultaneously, and complementarily turning on the second switch and the first switch.

8. The buck-boost circuit according to claim 1, further comprising:
  a control module configured to control switches based on a relationship between a target voltage $V_{tar}$ and an input voltage $V_{BAT}$,
  wherein said controlling the switches comprises:
  in response to $V_{tar}<V_{BAT}-\Delta V$ being satisfied, turning off the fifth switch, enabling the first switch and the third switch to be in opposite states or to be both in an off state, and complementarily turning on the second switch and the fourth switch, wherein $\Delta V$ denotes a set voltage difference;
  in response to $V_{BAT}-\Delta V \leq V_{tar} \leq V_{BAT}+\Delta V$ being satisfied, complementarily turning on the first switch and the third switch, complementarily turning on the fourth switch and the fifth switch, and truing on the second switch from turning-off of the fourth switch to truing-on of the first switch; and
  in response to $V_{tar}>V_{BAT}+\Delta V$ being satisfied, turning on the fifth switch, turning off the fourth switch, enabling the second switch and the third switch to operate simultaneously, and complementarily turning on the second switch and the first switch.

9. A buck-boost circuit, comprising a first switch, a second switch, a third switch, a fourth switch, a sixth switch, a first inductor, a first capacitor, and a second capacitor,
  wherein a first terminal of the first switch is connected to an anode of an input power supply; a first terminal of the second switch is connected to the anode of the input power supply; a first terminal of the third switch and a first terminal of the first capacitor are connected to a second terminal of the first switch; a second terminal of the third switch is connected to a cathode of the input power supply; a first terminal of the fourth switch, a second terminal of the first capacitor, and a first terminal of the first inductor are connected to a second terminal of the second switch; a second terminal of the fourth switch is connected to the cathode of the input power supply; a second terminal of the first inductor is connected to an anode of an output power supply; the second capacitor is connected in parallel between the anode and a cathode of the output power supply; and the sixth switch is connected in parallel with the first capacitor.

10. The buck-boost circuit according to claim 9, further comprising:
  a control module configured to control switches based on a relationship between a target voltage $V_{tar}$ and an input voltage $V_{BAT}$,
  wherein said controlling the switches comprises:
  in response to $V_{tar}<V_{BAT}-\Delta V$ being satisfied, turning on the sixth switch, enabling the first switch and the second switch to simultaneously operate, enabling the third switch and the fourth switch to simultaneously operate, and complementarily turning on the first switch and the third switch, wherein $\Delta V$ denotes a set voltage difference;
  in response to $V_{BAT}-\Delta V \leq V_{tar} \leq V_{BAT}+\Delta V$ being satisfied, turning off the first switch, the third switch, and the fourth switch, and turning on the second switch and the sixth switch; and
  in response to $V_{tar}>V_{BAT}+\Delta V$ being satisfied, turning off the fourth switch and the sixth switch, enabling the second switch and the third switch to operate simultaneously, and complementarily turning on the second switch and the first switch.

* * * * *